United States Patent Office 3,496,205
Patented Feb. 17, 1970

3,496,205
PROCESS FOR THE PREPARATION OF COM-
PLEXES OF ALUMINUM ALCOHOLATES
WITH ALUMINUM AND BORON HYDRIDES
Janos Kollonitsch, Westfield, and William H. Jones, Metuchen, N.J., assignors to Merck & Co., Inc., Rahway, N.J., a corporation of New Jersey
No Drawing. Filed June 23, 1965, Ser. No. 466,452
Int. Cl. C07f 5/06, 5/02
U.S. Cl. 260—448                                 6 Claims

ABSTRACT OF THE DISCLOSURE

Process for the preparation of compounds of the formula $AlH_3(BH_3)_3 \cdot 3Al(OR)_3$ wherein R represents the same or different hydrocarbon radical selected from the group consisting of alkyl, aralkyl and cycloalkyl which comprises reacting a mixture of an aluminum alcoholate and a boron trialkyl or an alkylated boron hydride with hydrogen.

---

This invention relates to the preparation of borane aluminum alcoholates. More particularly, it is concerned with an improved process for the preparation of complexes of aluminum alcoholates with aluminum and boron hydrides having the formula:

$$AlH_3(BH_3)_3 \cdot 3Al(OR)_3 \qquad (I)$$

wherein R represents the same or different hydrocarbon radicals from the group consisting of alkyl, aralkyl and cycloalkyl. These complexes are described in detail in United States Patent Nos. 2,903,470, 2,903,471 and 2,903,472.

These complexes are useful as reducing agents for reducing various organic and inorganic compounds, such as for example, aldehydes to carbinols, nitriles to amines, and carboxylic esters to primary carbinols. They are stable complexes, ranging from glassy solids to liquids and are soluble in a variety of solvents. The inexpensive synthesis of these versatile complex hydrides provides suitable agents for applications in various fields of chemistry where reducing agents of this particular character are needed.

It is an object of this invention to provide a new method for the preparation of complex reducing agents. It is a further object of this invention to provide an economical and simple process for the preparation of borane aluminum alcoholates. Other objects will become apparent from the detailed description of the invention.

Compounds of the general Formula I are produced according to the present invention by hydrogenation of a mixture of an alluminum alcoholate and a boron trialkyl compound or an alkylated boron hydride. The reaction utilized in this particular synthesis can be represented by the following equations:

(1) $4B(R_1)_3 + 4Al(OR)_3 + 12H_2 \rightarrow$
    $AlH_3(BH_3)_3 \cdot 3Al(OR)_3 + 12(R_1H) + B(OR)_3$ (2) $2R°_{6-x}B_2H_x + 4Al(OR)_3 + (12-x)H_2 \rightarrow$
    $AlH_3(BH_3)_3 \cdot 3Al(OR)_3 + B(OR)_3 + 2(6-x)R°H$ wherein R, R° and $R_1$ represent hydrocarbon groups from the group consisting of alkyl, arlkyl and cycloalkyl, and $x$ represents an integer from 1 to 5. In the above equation R, R° and $R_1$ can be similar or dissimilar.

The process of this invention can be carried out over wide ranges of temperature but generally it is preferable to operate at temperatures between about 150° C. and 250° C. with optimum results being obtained at temperatures between about 180° C. and 240° C. Similarly, the process of this invention can be carried out over wide ranges of pressure but generally it is preferable to operate at hydrogen pressures between 500 p.s.i.g. to about 5,000 p.s.i.g. with optimum results being obtained using hydrogen pressures between about 1,000 p.s.i.g. and 3,000 p.s.i.g.

Although an excess of alkylated boron compounds or alkylated boron hydrides used in this reaction can generally serve as a solvent, it is preferable to dissolve the reactants in a saturated hydrocarbon solvent such as hexane, cyclohexane and the like, especially when the product formed is not a liquid under the reaction conditions.

Generally, any alkyl boron compound or alkylated boron hydride can be used as a starting material in this reaction. It is preferable, however, to use those alkyl boron compounds or alkylated boron hydrides wherein the alkyl group contains from 1 to 10 carbon atoms and is selected from the group consisting of alkyl, aralkyl and cycloalkyl. These starting materials are well known in the art. Examples of these materials are compounds such as tri-isobutyl boron, triethyl boron, tri-n-hexyl boron, tricyclohexyl boron, tribenzyl boron, tetraethyldiboron dihydride, dibutyl diboron tetrahydride, triethyldiboron trihydride and pentyl-diboron pentahydride. A majority of these compounds are liquids. However, if the compound is a solid, a saturated hydrocarbon solvent may be used to carry out the reaction as previously explained.

Similarly, any aluminum alkoxide starting materials can be used. However, it is preferable to use those aluminum alkoxide starting materials wherein the alkyl group contains from 1 to 10 carbon atoms and is selected from the group consisting of alkyl, aralkyl and cycloalkyl. Examples of these materials are compounds such as aluminum isopropoxide, aluminum sec.-butoxide, aluminum cyclohexoxide, aluminum benzylate, and the like.

Since all the products and some of the starting materials used in the process of this invention are sensitive to oxidation, it is preferable to carry out the charging of reactors and operations of work-up under an inert atmosphere such as under dry nitrogen gas.

Once the reaction is complete and the theoretical amount of hydrogen is taken up, the desired product, namely the borane aluminum alcoholate can be isolated using procedures known in the art such as for example, concentration of the reaction mixture under reduced pressure, followed by a fractional distillation to yield substantially pure products.

The process of the present invention can be effected by mixing the two starting materials, preferably by dissolving them in a suitable inert hydrocarbon solvent, and then hydrogenating the resulting mixture. Alternatively, a mixture of the starting materials can be prepared in situ by reacting an appropriate boron alcoholate with an alkylated aluminum compound and then hydrogenating the mixture of the two products. Thus, for example, aluminum isopropoxide and tri-isobutyl boron, both starting materials in the process of this invention can be conveniently prepared by reacting the commercially available tri-isobutyl aluminum and isopropyl borate and the reaction mixture thus produced subjected to hydrogenation as previously described. A similar procedure can be used to prepare other combinations of starting materials to be used in the process of this invention.

Following is a group of examples which will illustrate the process of this invention. The examples are intended to be illustrations and not limitations of the invention.

EXAMPLE 1

Preparation of borane aluminum isopropoxide from aluminum isopropoxide and tri-isobutyl boron 81.6 grams of aluminum isopropoxide and 73.0 g. of tri-isobutyl boron are charged into a magnetically-stirred autoclave. Hydrogen gas is then admitted into the autoclave under a pressure of approximately 1,880 p.s.i.g. and the resulting mixture heated at 180° C. with stirring for 10 hours. After cooling to room temperature the autoclave is vented and the hydrogenation repeated for another 10 hours. After again cooling the autoclave to room temperature, the contents of the autoclave are washed out with hexane, the hexane distilled off, and the residue distilled at 1 m./m. pressure to yield 48.6 g. of a colorless, crystal-clear oil, which is substantially pure borane aluminum isopropoxide of the formula:

$$AlH_3(BH_3)_3 \cdot 3Al(OCH[CH_3]_2)_3$$

with a boiling point of 125° C.–135° C. at 1 m./m. pressure.

EXAMPLE 2

Preparation of borane aluminum isobutoxide from aluminum sec.-butoxide and triethyl boron Triethyl boron (98 g.) and aluminum sec.-butoxide (246.3 g.) are charged into a 600 ml. magnetically-stirred autoclave and hydrogen gas is admitted to a pressure of 2,000 p.s.i.g. The mixture is then heated at 190° C. under stirring for 9 hours. After cooling to room temperature, an 860 p.s.i.g. pressure drop is observed. The autoclave is vented to release the ethane-hydrogen mixture, fresh hydrogen gas is again admitted until 2,000 p.s.i.g. pressure is observed, and the mixture further hydrogenated as above for another 10-hour period. The pressure drop observed during the second hydrogenation is 360 p.s.i.g. This operation is repeated once more to result in only an insignificant pressure drop.

The reaction product is substantially pure borane aluminum isobutoxide mixed with isopropyl borate, which is a by-product of the reaction. Upon distillation in vacuo, 181 g. of pure borane aluminum isobutoxide of the formula $AlH_3(BH_3)_3 3Al(OiC_4H_9)_3$ is obtained in the form of a colorless, viscous oil having a boiling point of 125° C.–131° C. at 1 m./m. Hg pressure. The yield is 90% of theory.

EXAMPLE 3

Preparation of borane aluminum isopropoxide from aluminum isopropoxide and tri-n-hexyl boron Tri-n-hexyl boron (266 g.) and aluminum isopropoxide (206 g.) are charged into a 900 ml. magnetically-stirred autoclave and hydrogenated at 210° C.–220° C. in the pressure range of 1,200–5,000 p.s.i.g. as described in the previous examples. The hydrogenation is repeated twice more until no significant hydrogen pressure drop is observed.

By distillation in vacuo under 1 m./m. Hg pressure, 145.4 g. of borane aluminum isopropoxide is obtained after a forerun of isopropyl borate. The borane aluminum isopropoxide of the formula:

obtained has a boiling point of 125° C.–128° C. at 1 m./m. Hg pressure.

EXAMPLE 4

Preparation of borane aluminum cyclohexoxide from aluminum cyclohexoxide and tri-isobutyl boron A mixture of 91 g. tri-isobutyl boron and 162.3 g. aluminum cyclohexoxide is hydrogenated in a 600 ml. magnetically-stirred autoclave under a starting pressure of 2,800 p.s.i.g. at 230° C.–240° C. for 9 hours. The hydrogenation is repeated twice more as described in Example 2. After venting of the hydrogen pressure, the reaction mixture is distilled in a vacuum of 0.14 m./m. Hg pressure to result in 322 g. of borane aluminum cyclohexoxide, $AlH_3(BH_3)_3 3Al(OC_6H_{11})_3$, which has a boiling point of 145° C.–151° C. at 0.14 m./m. Hg pressure.

EXAMPLE 5

Preparation of borane aluminum tri-sec. amylate from aluminum sec.-amylate and tricyclohexyl boron A mixture made of 130 g. of tricyclohexyl boron and 144.2 g. of aluminum sec.-amylate is hydrogenated at 200° C. in the 600–1,250 p.s.i.g. pressure range for 7 hours. After the autoclave is cooled to room temperature, the hydrogen pressure is released and the cyclohexane formed is distilled off at room temperature in a vacuum of 1–2 m./m. Hg. The hydrogenation is then repeated twice more in a similar fashion to that described in Example 2. The main product, borane aluminum tri-sec. amylate, $AlH_3(BH_3)_3 3Al(OC_5H_{11})_3$, is isolated by distillation in vacuo. Approximately 104 g. of product having a boiling point of 134° C.–136° C. at 0.5 m./m. Hg are obtained.

EXAMPLE 6

Preparation of borane aluminum benzylate from aluminum benzylate and tri-n-propyl boron A mixture of 174 g. of aluminum benzylate and 70 g. of tri-n-propyl boron is hydrogenated in a 600 ml. autoclave equipped with a magnetically-operated stirrer. The initial pressure of hydrogen is 1,200 p.s.i.g. at room temperature and the reaction is run at 175° C.–185° C. for 10 hours. After venting the autoclave to release the mixture of propane and hydrogen, the hydrogenation is repeated three more times, only negligible pressure change being observed in the last hydrogenation cycle. The desired product, namely borane aluminum benzylate having the formula $AlH_3(BH_3)_3 3Al(OCH_2C_6H_5)_3$, is isolated by distillation in a vacuum of 0.0001 m./m. Hg. Its formula is corroborated by assay for Al, B, C and active hydrogen.

EXAMPLE 7

Preparation of borane aluminum sec.-butoxide from aluminum sec.-butoxide and tribenzyl boron A mixture of 113.6 g. of tribenzyl boron and 123 g. of aluminum sec.-butoxide is hydrogenated in an autoclave equipped with magnetic stirrer at 220° C. and 2,500 p.s.i.g. starting pressure for 11 hours. The hydrogenation is repeated twice more until only a negligible pressure drop occurs. thus indicating the completion of the reaction. The reaction product, borane aluminum sec.-butoxide of the formula $AlH_3(BH_3)_3 3Al(OC_4H_9)_3$, is isolated by distillation in vacuo in an approximate yield of 78% of theory.

EXAMPLE 8

Preparation of borane aluminum isopropoxide from aluminum isopropoxide and tetraethyl diboron dihydride Thirty-five grams of tetraethyl diboron dihydride (0.25 mole) and 102 g. (0.50 mole) of aluminum isopropoxide are charged into a 300-ml. magnetically-stirred autoclave maintained under a nitrogen atmosphere. After replacement of the nitrogen with hydrogen, the hydrogen pressure is raised to 2,000 p.s.i.g. and the temperature to 205°. After 11 hours of stirring, the autoclave is cooled back to room temperature, vented, repressurized with hydrogen to 2,000 p.s.i.g. and hydrogenated again as above. This cycle is repeated once more, to result in a mixture of borane aluminum isopropoxide and isopropyl borate. The product is washed out of the autoclave with hexane, the hexane distilled off at atmospheric pressure and the residue distilled in vacuo, to give an 88% yield of the boron aluminum isopropoxide having a boiling point of 120–125° at 0.7 m./m.

In a convenient variation of this procedure, the commercially available diethyl aluminum hydride is first reacted with isopropyl borate according to the following reaction:

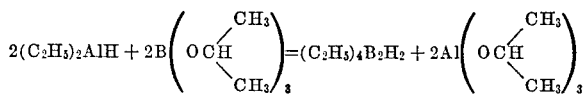

and then the mixture of tetraethyl diboron dihydride and aluminum isopropoxide thus obtained is hydrogenated as described above.

EXAMPLE 9

Preparation of borane aluminum sec.-butoxide from aluminum sec.-butoxide and dibutyl diboron tetrahydride Twenty-one grams of dibutyl diboron tetrahydride (0.15 mole) and 73.8 g. (0.30 mole) of aluminum sec.-butoxide are charged into a 300-ml. magnetically-stirred autoclave and hydrogenated at 220° C. for 7 hours under an initial hydrogen gas pressure of 2300 p.s.i.g. After it is cooled to room temperature, the autoclave is vented, hydrogen charged again and the hydrogenation cycle repeated. After a third hydrogenation cycle, the reaction is complete. The product is washed out from the autoclave with hexane, the hexane distilled off and the residue, consisting of a mixture of isobutyl borate and borane aluminum sec.-butoxide, is separated by fractional distillation in vacuo, to give pure borane aluminum sec.-butoxide which has a boiling point of 130–134° at 0.6 m./m. pressure. The yield is 75% of theory.

In a very convenient variation of the process, the starting material is prepared by reacting butyl aluminum dihydride with sec.-butyl borate according to the following equation:

$$2C_4H_9AlH_2 + 2B(O\ sec.\ C_4H_9)_3$$
$$= (C_4H_9)_2B_2H_4 + 2Al(O\ sec.\ C_4H_9)_3$$

and the products of this reaction are then subjected to the above reaction.

EXAMPLE 10

Preparation of borane aluminum isopropoxide from aluminum isopropoxide and triethyl diboron trihydride 102 grams of aluminum isopropoxide (0.50 mole) is charged into a 300 ml. magnetically-stirred autoclave, followed by 28 g. (0.25 mole) of triethyl diboron trihydride [$(C_2H_5)_3BBH_3$]. During the charging, a nitrogen atmosphere is employed; this is then replaced by hydrogen gas, with the hydrogen pressure being raised to 2300 p.s.i.g. and the temperature to 215° C. After 16 hours of stirring, the autoclave is cooled back to room temperature, vented to release the mixture of ethane and hydrogen formed during the reaction, repressurized with hydrogen as before, then heated at 215° C. for another 14 hours. This cycle is repeated once more to give a mixture of borane aluminum isopropoxide and isopropyl-borate. The product is washed out of the autoclave with hexane, the hexane distilled off at atmospheric pressure and the residue distilled in vacuo to give an 81% yield of borane aluminum isopropoxide, which has a boiling point of 120–125° at 0.7 m./m. Hg pressure.

The starting material for this synthesis is easily made available by reacting equimolecular amounts of aluminum ethyl sesquihydride and isopropylborate according to the following equation:

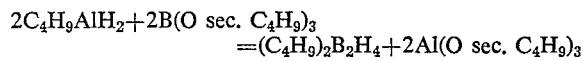

EXAMPLE 11

Preparation of borane aluminum sec.-butoxide from aluminum sec.-butoxide and pentyl diboron pentahydride 14.5 grams of pentyl diboron pentahydride (0.15 mole) and 73.8 g. (0.30 mole) of aluminum sec.-butoxide are charged into a 300 ml., stainless steel autoclave, which is also equipped with a magnetic stirrer. The charging is done under protective blanket of nitrogen gas, which is then replaced by hydrogen, until a pressure of 1750 p.s.i.g. is reached. The autoclave is then heated to 195° for 8 hours with stirring. After cooling down to room temperature, the pressure is released, hydrogen is pressed in again to 1800 p.s.i.g. and the autoclave heated to 195° and stirred for another 8-hour period. This cycle is repeated once more, to result in a mixture of borane aluminum sec.-butoxide and sec.-butyl borate. This mixture is washed out of the autoclave with hexane, the hexane distilled off and the residue fractionated in vacuo at a pressure of 0.5 m./m. Hg. Borane aluminum sec.-butoxide is obtained in the form of a colorless, viscous liquid with a boiling point of 130–134°.

The pentyl diboron pentahydride-aluminum sec.-butoxide mixture employed in this reaction can be conveniently obtained by reacting an equimolecular mixture of pentyl aluminum dihydride and aluminum hydride with tri-sec.-butyl borate.

EXAMPLE 12

Preparation of borane aluminum isopropoxide from aluminum isopropoxide and ethyl diboron pentahydride Into a 300 ml., magnetically stirred autoclave is charged a mixture of 102 g. of aluminum isopropoxide (0.50 mole) and 14 g. of ethyl diboron pentahydride (0.25 mole). Hydrogen gas is then admitted into the autoclave to a pressure of 2600 p.s.i.g.; the temperature is raised to 235° and the reaction mixture stirred at this temperature for 21 hours. After the autoclave is cooled back to room temperature, the gas mixture of ethane and hydrogen is vented. Hydrogen gas is pressed in again and the reaction repeated under similar conditions. The whole cycle is repeated once more. The usual work-up as described in the previous examples gives borane aluminum isopropoxide in a yield of 89% of theory.

What is claimed is:

1. A method for the preparation of borane aluminum alcoholates having the formula $AlH_3(BH_3)_3 \cdot 3Al(OR)_3$ wherein R is an alkyl, aralkyl or cycloalkyl group having from 1 to 10 carbon atoms which comprises reacting a mixture of an aluminum alcoholate of the formula $Al(OR)_3$ wherein R is as defined above and an alkylated boron compound of the formula $(R)_3$ or $(R)_6B_{-x}B_2H_x$ wherein R is as defined above and x is an integer from 1 to 5 with hydrogen at between 500 to 5,000 p.s.i.g. pressure and at a temperature of between 100° C. and 250° C.

2. A method for the preparation of borane aluminum alcoholates having the formula

which comprises reacting aluminum isopropoxide and tri-isobutyl boron with hydrogen at between 500 and 5,000 p.s.i.g. pressure and at a temperature between 150° C. and 250° C.

3. A method for the preparation of borane aluminum alcoholates having the formula

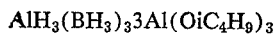

which comprises reacting aluminum sec.-butoxide and triethyl boron with hydrogen at between 500 and 5,000 p.s.i.g. pressure and at a temperature between 150° C. and 250° C.

4. A method for the preparation of borane aluminum alcoholates having the formula

which comprises reacting aluminum isopropoxide and tetraethyldiboron dihydride with hydrogen at between 500 and 5,000 p.s.i.g. pressure and at a temperature between 150° C. and 250° C.

5. A method for the preparation of borane aluminum alcoholates having the formula $$AlH_3(BH_3)_3 \cdot 3Al(OCH[CH_3]_2)_3$$

which comprises reacting aluminum isopropoxide and triethyl - diboron - trihydride with hydrogen at between 500 and 5,000 p.s.i.g. pressure and at a temperature between 150° C. and 250° C.

6. A method for the preparation of borane aluminum alcoholates having the formula $$AlH_3(BH_3)_3 3Al(OC_4H_9)_3$$

which comprises reacting aluminum sec.-butoxide and pentyl diboron pentahydride with hydrogen at between 500 and 5,000 p.s.i.g. pressure and at a temperature between 150° C. and 250° C.

References Cited

UNITED STATES PATENTS

| | | |
|---|---|---|
| 2,903,472 | 9/1959 | Kollonitsch. |
| 2,992,267 | 7/1961 | Köster _____ 260—462 |
| 3,035,083 | 5/1962 | Jenkner _____ 260—462 |
| 3,097,066 | 7/1963 | Köster. |
| 3,115,526 | 12/1963 | D'Alelio. |
| 3,131,224 | 4/1964 | D'Alelio. |

DANIEL E. WYMAN, Primary Examiner

H. M. S. SNEED, Assistant Examiner

U.S. Cl. X.R.

260—606.5

UNITED STATES PATENT OFFICE
CERTIFICATE OF CORRECTION

Patent No. 3,496,205      Dated February 17, 1970

Inventor(s) Janos Kollonitsch - William H. Jones

It is certified that error appears in the above-identified patent and that said Letters Patent are hereby corrected as shown below:

Claim 1 [Column 6, line 47] --

$(R)_3$ should correctly read -- $B(R)_3$ --

$(R)_6B_{-x}B_2H_x$ should read -- $(R)_{6-x}B_2H_x$ --

SIGNED AND
SEALED
JUL 28 1970

(SEAL)
Attest:

Edward M. Fletcher, Jr.
Attesting Officer

WILLIAM E. SCHUYLER, JR.
Commissioner of Patents